United States Patent
Helmy et al.

(10) Patent No.: US 8,432,799 B1
(45) Date of Patent: Apr. 30, 2013

(54) OBTAINING HIGH AVAILABILITY USING TCP PROXY DEVICES

(75) Inventors: Youssri Helmy, Los Altos, CA (US); Tarek Nabhan, Cairo (EG)

(73) Assignee: F5 Networks, Inc., Seattle, WA (US)

( * ) Notice: Subject to any disclaimer, the term of this patent is extended or adjusted under 35 U.S.C. 154(b) by 0 days.

(21) Appl. No.: 13/475,694

(22) Filed: May 18, 2012

Related U.S. Application Data

(63) Continuation of application No. 13/306,886, filed on Nov. 29, 2011, now Pat. No. 8,203,949, which is a continuation of application No. 11/272,442, filed on Nov. 10, 2005, now Pat. No. 8,159, 940.

(60) Provisional application No. 60/627,058, filed on Nov. 12, 2004, provisional application No. 60/626,641, filed on Nov. 11, 2004.

(51) Int. Cl.
*H04L 1/00* (2006.01)
(52) U.S. Cl.
USPC .......................................... 370/230; 370/235
(58) Field of Classification Search ........................ None
See application file for complete search history.

(56) References Cited

U.S. PATENT DOCUMENTS

| | | | |
|---|---|---|---|
| 4,891,643 A | 1/1990 | Mitchell et al. | |
| 5,276,898 A | 1/1994 | Kiel et al. | |
| 5,333,212 A | 7/1994 | Ligtenberg | |
| 5,488,483 A | 1/1996 | Murayama | |
| 5,559,978 A | 9/1996 | Spilo | |
| 5,646,946 A | 7/1997 | VanderMeer et al. | |
| 5,657,452 A | 8/1997 | Kralowetz et al. | |
| 5,657,525 A | 8/1997 | Hoyt et al. | |
| 5,768,525 A | 6/1998 | Kralowetz et al. | |
| 5,909,250 A | 6/1999 | Hardiman | |
| 5,945,933 A | 8/1999 | Kalkstein | |
| 6,012,062 A | 1/2000 | Jagadish et al. | |
| 6,115,384 A | 9/2000 | Parzych | |
| 6,138,156 A | 10/2000 | Fletcher et al. | |
| 6,178,489 B1 | 1/2001 | Singh | |
| 6,304,567 B1 | 10/2001 | Rosenberg | |
| 6,314,095 B1 | 11/2001 | Loa | |
| 6,397,259 B1 | 5/2002 | Lincke et al. | |
| 6,449,558 B1 | 9/2002 | Small | |
| 6,473,458 B1 | 10/2002 | Shimizu et al. | |
| 6,477,201 B1 | 11/2002 | Wine et al. | |
| 6,658,463 B1 | 12/2003 | Dillon et al. | |

(Continued)

FOREIGN PATENT DOCUMENTS

| EP | 0929173 A2 | 7/1999 |
|---|---|---|
| EP | 0947104 B1 | 11/2002 |

(Continued)

OTHER PUBLICATIONS

Official Communication for U.S. Appl. No. 13/306,886 mailed Feb. 21, 2012.

(Continued)

*Primary Examiner* — Jianye Wu
(74) *Attorney, Agent, or Firm* — Frommer Lawrence & Haug LLP; Jamie L. Wiegand

(57) ABSTRACT

The present invention relates to increasing performance of Wide Area Network (WAN) communications and in particular to a redundant proxy device associated with one end of a transport layer connection that monitors packet traffic and selectively reroutes packets to a proxy application.

20 Claims, 17 Drawing Sheets

U.S. PATENT DOCUMENTS

| | | |
|---|---|---|
| 6,728,785 B1 | 4/2004 | Jungck |
| 6,763,031 B1 | 7/2004 | Gibson et al. |
| 6,879,631 B1 | 4/2005 | Schultz et al. |
| 6,882,753 B2 | 4/2005 | Chen et al. |
| 6,904,176 B1 | 6/2005 | Chui et al. |
| 6,907,071 B2 | 6/2005 | Frojdh et al. |
| 7,126,955 B2 | 10/2006 | Nabhan et al. |
| 7,639,700 B1 | 12/2009 | Nabhan et al. |
| 8,159,940 B1 | 4/2012 | Helmy et al. |
| 2002/0071438 A1 | 6/2002 | Singh |
| 2002/0136224 A1 | 9/2002 | Motley |
| 2003/0177396 A1 | 9/2003 | Bartlett et al. |
| 2004/0015591 A1 | 1/2004 | Wang |
| 2004/0103215 A1 | 5/2004 | Ernst et al. |
| 2004/0103225 A1 | 5/2004 | McAlpine et al. |
| 2006/0265689 A1 | 11/2006 | Kuznetsov et al. |

FOREIGN PATENT DOCUMENTS

| | | |
|---|---|---|
| EP | 1276324 A1 | 1/2003 |
| EP | 1424779 A1 | 6/2004 |
| EP | 1434437 A2 | 6/2004 |
| WO | 0007083 A1 | 2/2000 |
| WO | 01/037516 | 5/2001 |
| WO | 0171701 A2 | 9/2001 |
| WO | 03073719 A1 | 9/2003 |
| WO | 2004036501 A2 | 4/2004 |

OTHER PUBLICATIONS

Huffman, D. A. "A Method for the Construction of Minimum-Redundancy Codes," Proceedings of the I.R.E., 1952, 40: 1098-1101.

Ziv, J. et al., "A Universal Algorithm for Sequential Data Compression," IEEE Transactions on Information Theory, 1977, IT23(3):337-343.

Gailly, J. "gzip The Data Compression Program," Edition 1.2.4 for Gzip Version 1.2.4, Jul. 1993, pp. 1-13 www.gnu.org/software/gzip/manual/html_mono/gzip.html.

"Gzip—Wikipedia, the free encyclopedia", Wikipedia, pp. 1-4, Dec. 6, 2005. Can be found at http://en.wikipedia.org/wiki/Gzip.

Gailly, J., "Invoking gzip", pp. 1-2, Jul. 1993. Can be found at http://www.math.utah.edu/docs/info/gzip_4.html#SEC7.

"Data compression—Wikipedia, the free encyclopedia", Wikipedia, pp. 1-7, Dec. 6, 2005. Can be found at http://en.wikipedia.org/wiki/Data_compression_algorithm.

Roelofs, G., zlib A Massively Spiffy Yet Delicately Unobtrusive Compression Libarary (Also Free, Not to Mention Unencumbered by Patents), pp. 1-5, Last updated on Aug. 7, 2005. Can be found at http://www.zlib.net.

Krintz, C., et al., "Adaptive on-the-Fly Compression (Abstract)", EEE Computer Society, vol. 17, No. 1, pp. 1-2, Jan. 2006. Can be found at http://csdl2.computer.org/persagen/DLAbsToc.jsp?resourcePath=/dl/trans/td/&toc=comp/trans/td/2006/01/l1toc.xml&DOI-10.1109/TPDS.2006.3.

Gailly, J., et al., "The gzip home page", pp. 1-8, Last updated Jul. 27, 2003. Can be found at http://www.gzip.org.

"AppCelera: Smart Compression" eWEEK.com, Ziff Davis Publishing Holdings Inc., pp. 1-11, © 1996-2006. Can be found at http://ww.eweek.com /article2/0,1759,755242,00.asp.

Gailly, J., et al., "zlib 1.1.4 Manual", pp. 1-14, Mar. 11, 2002. Can be found at http://www.zlib.net/manual.html.

F5 Networks, Inc. "Configuration Guide for Local Traffic Management" Version 9.0, MAN-0122-01, Chapter 6, pp. 1-26, © 1996-2005.

Fielding, R., et al., "Hypertext Transfer Protocol—HTTP/1.1", IETF, RFC 2616, pp. 1-18, Jun. 1999.

Pierzchala, S., "Compressing Web Content with mod_gzip and mod_deflate", Linux Journal, pp. 1-10, Apr. 26, 2004. Can be found at http://linuxjournal.com/article/6802.

"Data compression ratio—Wikipedia, the free encyclopedia" Wikipedia, pp. 1-2, Dec. 6, 2005. Can be found at http://en.wikipedia.org/wiki/data_compression_ratio.

"HTTP Compression Speeds up the Web", pp. 1-5. Can be found at http://webreference.com/internet/software/servers/http-compression.html, Oct. 13, 2000.

Leurs, L., "Flate/deflate compression", pp. 1-2, © 2000. Can be found at http://prepressure.com/techno/compressionflate.htm.

Deutsch, P., et al. "ZLIB Compressed Data Format Specification version 3.3", IETF, RFC 1950, pp. 1-11, May 1996.

Jeannot, E., et al., "Adaptive Online Data Compression", 11th IEEE International Symposium on High Performance Distributed Computing, pp. 1-57, 2002.

Deutsch, P., "Deflate Compressed Data Format Specification version 1.3", IETF, RFC 1951, pp. 1-17, May 1996.

Gailly, J., "Overview", pp. 1-2, Jul. 1993. Can be found at http://www.math.utah.edu/docs/info/gzip_2.html#SEC5.

Friend, R., et al., "IP Payload Compression Using LZS", IETF, RFC 2395, pp. 1-9, Dec. 1998.

Heath, J., et al., "IP Payload Compression Using ITU-T V.44 Packet Method", IETF, RFC 3051, pp. 1-8, Jan. 2001.

Seshan, S., et al., "SPAND: Shared Passive Network Performance Discovery", USENIX Symposum on Internet Technologies and Systems, pp. 1-13, Dec. 1997.

"HTTP Compression", pp. 1-5. Last modified Jan. 17, 2006, Can be found at http://www.websiteoptimization.com/speed/tweak/compress/.

Pereira, R., "IP Payload Compression Using DEFLATE", IETF, RFC 2394, pp. 1-6. Dec. 1998.

Roelofs, G., et al., "zlib Frequently Asked Questions", pp. 1-7, last modified Jun. 18, 2005 by Mark Adler, © 1996-2005. Can be found at http://www.zlib.net/zlib_faq.html#faq38.

"HTTP Compression speeds up the Web What is IETF Content Encoding (or HTTP Compression)?" pp. 1-5, Apr. 20, 2002. Can be found at http://webreference.com/internet/software/servers/http.compression/2.html.

Deutsch, P. "GZIP file format specification version 4.3," IETF, RFC 1952, pp. 1-12, May 1996.

Berners-Lee, T., et al., "Hypertext Transfer Protocol—HTTP/1.0", IETF, RFC 1945, pp. 1-23, May 1996.

Official Communication for U.S. Appl. No. 10/354,438 mailed Oct. 4, 2004.

Official Communication for U.S. Appl. No. 10/354,438 mailed Jun. 16, 2005.

Official Communication for U.S. Appl. No. 10/354,438 mailed Mar. 9, 2006.

Official Communication for U.S. Appl. No. 10/354,438 mailed Aug. 22, 2006.

Official Communication for U.S. Appl. No. 11/551,582 mailed Feb. 13, 2009.

Official Communication for U.S. Appl. No. 11/551,582 mailed Aug. 20, 2009.

Reardon, Marguerite, "A Smarter Session Switch: Arrowpoint's CS Session Switches Boast the Brains Needed for E-Commerce," Data Communications, Jan. 1999. Title Page, pp. 3, 5, 18.

Hewitt, John R. et al., "Securities Practice and Electronic Technology," Corporate Securities Series, (New York: Law Journal Seminars-Press) 1998, Title Page, Bibliography Page, pp. 4.29-4.30.

Lee, Ying-Da, "SOCKS: A Protocol for TCP Proxy Across Firewalls", NEC Systems, pp. 1-3. http://socks.permeo.com/protocol/socks4.protocol, Apr. 3, 2002.

Leech, M. et al., "SOCKS Protocol Version 5", IETF, RFC 1928, pp. 1-9, Mar. 1996.

Kitamura, H., "A SOCKS-based IPv6/IPv4 Gateway Mechanism", IETF, RFC 3089, pp. 1-12, Apr. 2001.

Building Internet Firewalls, "7.6 Using SOCKS for Proxying", Unix.org, pp. 1-3, http://www.unix.org.ua/orelly/networking/firewall/ch07_06.htm, Nov. 1995.

Gaitan, I., "Design of a TCP Proxy, Which Provides Secure Tunneling to Another TCP Proxy", pp. 1-6, Mar. 6, 1999. http://www.student.nada.kth.se/~d94-iga/TCP_Proxy.pdf.

Official Communication for U.S. Appl. No. 11/272,442 mailed Dec. 12, 2011.

Official Communication for U.S. Appl. No. 11/272,442 mailed Mar. 2, 2011.

Official Communication for U.S. Appl. No. 11/272,442 mailed Oct. 14, 2010.

Official Communication for U.S. Appl. No. 11/272,442 mailed May 13, 2010.
Official Communication for U.S. Appl. No. 11/272,442 mailed Nov. 12, 2009.
Official Communication for U.S. Appl. No. 11/272,442 mailed May 14, 2009.
Official Communication for U.S. Appl. No. 11/272,442 mailed Oct. 31, 2008.

OBTAINING HIGH AVAILABILITY USING TCP PROXY DEVICES

CROSS-REFERENCE TO RELATED APPLICATIONS

The present application is a continuation application claiming priority from U.S. patent application Ser. No. 13/306,886 entitled "Obtaining High Availability Using TCP Proxy Devices," filed on Nov. 29, 2011, which claims priority to continuation application claiming priority from U.S. patent application Ser. No. 11/272,442 entitled "Obtaining High Availability Using TCP Proxy Devices," filed on Nov. 10, 2005, which in turn claims priority from provisional application Ser. No. 60/626,641 entitled "Obtaining High Availability Using TCP Proxy Devices," filed on Nov. 11, 2004, and from provisional application Ser. No. 60/627,058 entitled "Obtaining High Availability Using TCP Proxy Devices," filed on Nov. 12, 2004, and each of which is hereby incorporated within in their entirety.

BACKGROUND OF THE INVENTION

The present invention relates to increasing performance of Networked communications and in particular to seamlessly maintaining connection-oriented communication between end-terminal devices in an IP-based network.

The growth in data communication traffic, including email, client/server applications, multimedia applications, Internet and intranet applications, has continued with an increasing number of applications being implemented across the networks. Often provided with ample networking infrastructure, an increasing number of applications are being designed and implemented across the network. This is particularly true for enterprise applications. Thus, it is increasingly likely that a user's business applications will be established across a network.

Unfortunately, by incorporating a network into an application, the application users will be subject to the available network capacity, communications costs, and availability. If an interrupt should occur in the network, the application will effectively "break" leaving the user to reestablish the application and possibly have to deal with corrupted or even lost information. Such interrupts can result from hardware failures or even from increased network traffic.

The Open Systems Interconnection (OSI) reference model is a widely used model describing the flow of data traffic across a network. The OSI model has seven layers; each of the seven layers communicates with a layer below it through a specific interface and its peer layer on a different system in the network through a specific protocol. The combination of all networking protocol layers is often referred to as the networking stack. Packet based Transmission Control Protocol over Internet Protocol (TCP/IP) is perhaps the most widely known protocol in use in the Internet. IP is a network layer (Layer 3), packet-oriented protocol that defines a set of standards for addressing and routing of packets across a connectionless network. TCP is a connection oriented, transport layer (Layer 4) protocol that defines a way to ensure reliable transport of information.

SUMMARY OF THE INVENTION

The present invention relates to a method of seamlessly maintaining connection-oriented communication between end-terminal devices in an IP-based network. To accomplish this, an overlay network is established including a number of proxy devices. The proxy devices monitor data traffic between the communicating end-terminal devices and seamlessly redirect the data traffic through the overlay network between the same communicating end-terminal devices. The redirection is initiated upon the occurrence of a predetermined event related to the connection-oriented communication. In this way, the overlay network can be used to reconstruct TCP flows in a TCP/IP network, for example, even if an IP link is lost or changed.

Examples of some events that may cause the data traffic to be redirected include component or cable failures. Alternatively or in addition, the data traffic may be redirected from a first network path to a second network path in response to automatic load balancing, or even in response to a user's preference. For example, a network path providing connection-oriented communications path for an application running for an extended period of time may be changed to an alternate network path according to actual loading (i.e., load balancing) or the time of day to obtain more favorable throughput or cost.

In another aspect, the present invention relates to a network architecture for seamlessly maintaining connection-oriented communications between end-terminal devices in an IP-based network. The architecture includes a first proxy device in communication with an IP-based network and in further communication with an end-terminal device. The first proxy device forwards data traffic between the IP-based network and the end-terminal device. The architecture also includes a second proxy device also in communication with the IP-based network. The first and second proxy devices are coupled through a separate communications link. In operation, the second proxy device monitors data traffic between the IP-based network and the first proxy device. The second proxy is aware of which flows the first proxy device is responsible for handling. Thus, the second proxy device can seamlessly redirect data traffic between the IP-based network using the separate communications link. For example, the second proxy device can redirect data traffic for any of the reasons discussed above.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
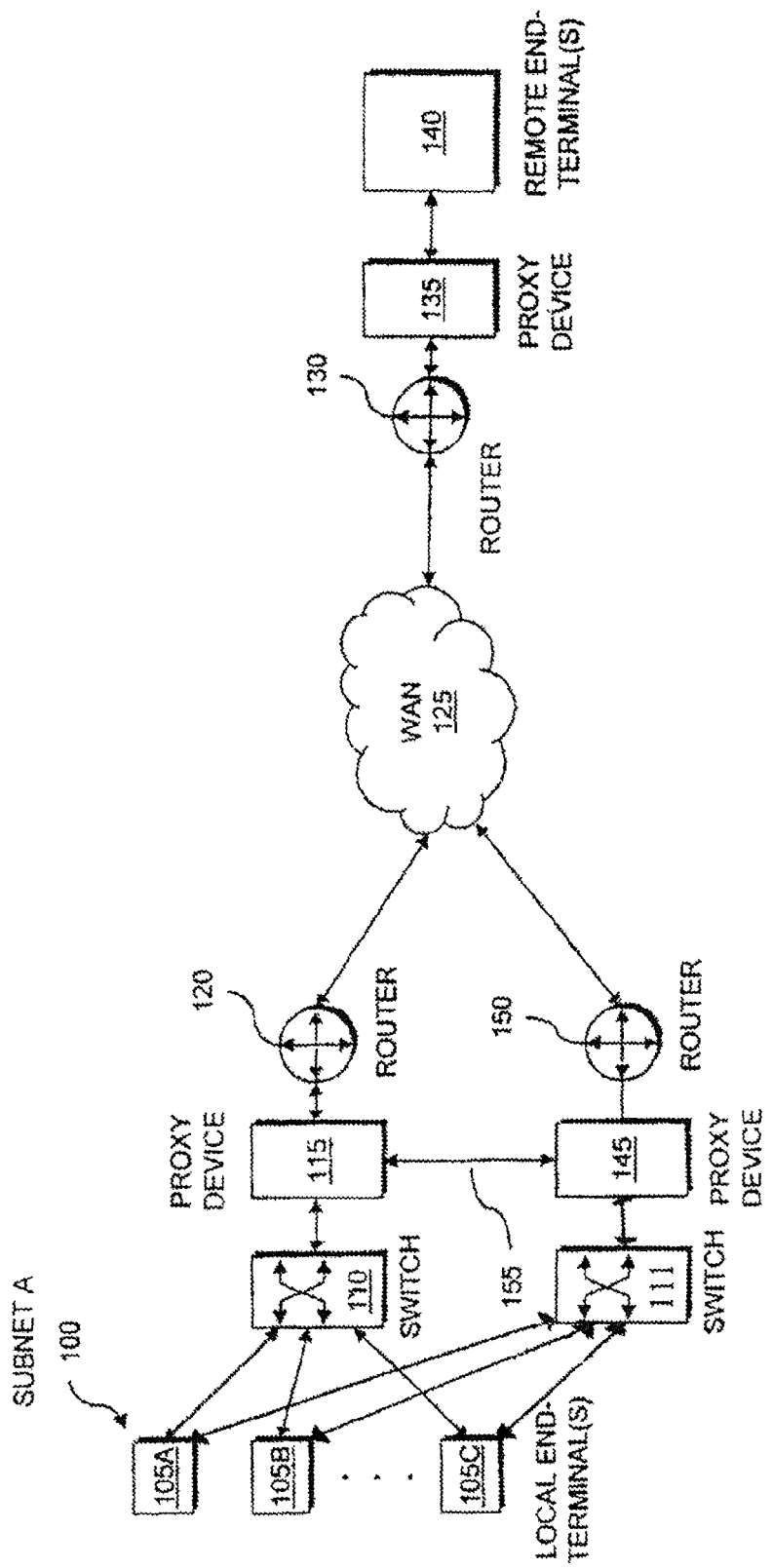
FIG. 1 is a high-level block diagram showing an exemplary configuration using redundant proxy servers implemented in a WAN network.

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods or devices. Accordingly, the invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, although it may. Nor does the phrase "in another embodiment" necessarily refer to a different embodiment, although it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

A description of preferred embodiments of the invention follows.

A method of seamlessly maintaining connection-oriented communication between end-terminal devices in an IP-based network is accomplished using a specialized arrangement using proxy devices. This architecture includes a first proxy device in communication with an IP-based network and in further communication with an end-terminal device. The first proxy device forwards data traffic between the IP-based network and the end-terminal device. The architecture also includes a second proxy device also in communication with the IP-based network. The first and second proxy devices are coupled through a separate communications link.

In operation, the second proxy device monitors data traffic between the IP-based network and the first proxy device. The second proxy device can seamlessly redirect data traffic between the IP-based network and the first proxy device using the separate communications link. The overlay network includes a number of proxy devices. The proxy devices monitor data traffic between the communicating end-terminal devices and seamlessly redirect the data traffic through the overlay network between the same communicating end-terminal devices. The redirection is initiated upon the occurrence of a predetermined event related to the connection-oriented communication.

Examples of some events that may cause the data traffic to be redirected include component or cable failures. Alternatively or in addition, the data traffic may be redirected from a first network path to a second network path in response to automatic load balancing, or even in response to a user's preference. For example, a network path providing connection-oriented communications path for an application running for an extended period of time may be changed to an alternate network path according to actual loading (i.e., load balancing) or the time of day to obtain more favorable throughput or cost.

An exemplary network configuration shown in FIG. 1 includes a first end-terminal device communicating with a second end terminal device across a packet-based network, such as an IP-based network. The configuration of first end-terminal device can include a client workstation 105A that may be part of a subnet 100 of other end-terminal devices 105B, 105C (generally 105). The client workstation 105A is coupled to a Wide Area Network (WAN) 125 through a first proxy device 115 and an edge router 120. At the remote end of the link a second end-terminal device 140 is similarly coupled to the same WAN 125 through a remote proxy device 135 and an edge router 130. The first end-terminal devices 105 can represent a first Local Area Network (LAN) at a branch office of an enterprise network; whereas, the remote end-terminal device 145 may represent a second LAN at a data center.

A second proxy device 145 is also coupled to the WAN 125 through an edge router 150 and further coupled to the first proxy device 115. The first and second proxy devices 115, 145 are coupled together by a separate communications link 155 interconnecting to the first and second proxy devices 115, 145 at respective peer interfaces. The interconnected proxy devices 115, 145 represent part of an overlay network. The overlay network more generally allows the packets to pass the network from any ingress/egress device.

A redundant switch 111 may also be provided between the subnet A 100 and the second proxy device 145. As shown in FIG. 1, redundant interconnections can be provided to at least one local end terminal to selectively permit signal routing through either of the redundant switches 110-111, proxy devices 115, 145, and/or routers 150.

Communications between the proxy devices can be accomplished using a dedicated communications link. For example, two proxy devices that are in close physical proximity can be coupled using a dedicated communications cable. Any one of a number of standard communications protocols could be used for communicating between the two devices over the dedicated cable. Alternatively or in addition, a proprietary protocol could be used between the two devices. However, in a preferred embodiment, the overlay network to a TCP network permits components of the overlay network to reside in physically different locations. Thus, the communications link between the first and second proxy devices can be accomplished over the WAN 125 (e.g., using TCI/IP) or over a dedicated communications link, such as a leased line or dial-up connection.

Figure 2:
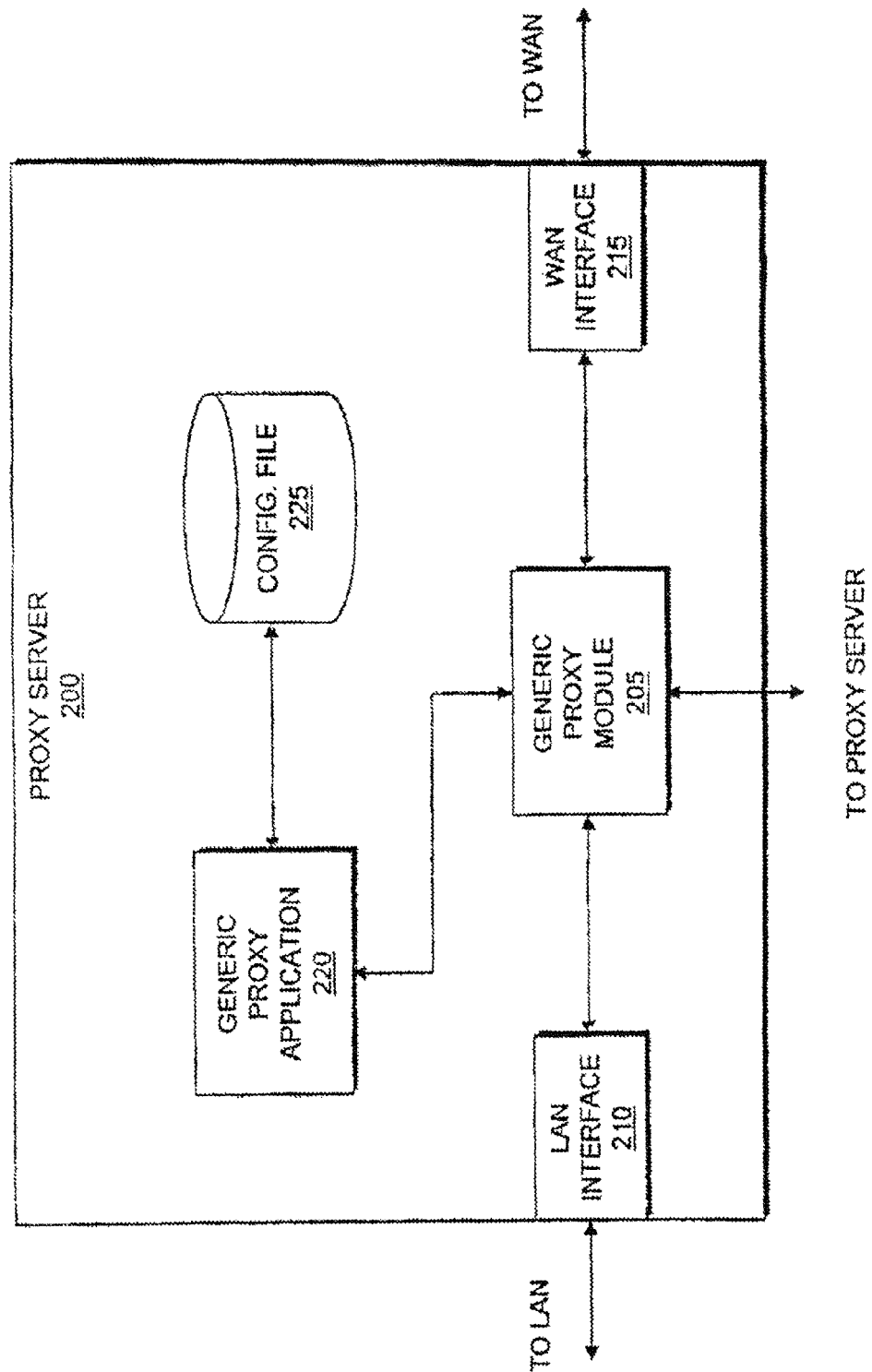
FIG. 2 is a more detailed block diagram of one of the proxy servers shown in FIG. 1.

One embodiment of a proxy device is illustrated in FIG. 2. Generally, a proxy server 200 communicates between a WAN 125 and a LAN. Thus, the proxy server 200 includes suitable interfaces, such as a WAN interface 215 and a LAN interface 210. A generic proxy module is coupled between the two interfaces 210, 215. The proxy module 205 communicates with a generic proxy application 220. The proxy application 200, in turn, is in communication with a configuration file 225.

In operation, the proxy server 200 receives connection-oriented communications (e.g., packets) at its LAN interface 210. The proxy module 205 monitors the communications and redirects the communications, as necessary, according to the controlling proxy application 220. For example, the proxy application 220 can be preconfigured with rules that control the redirection of communications. As control and redirection depend at least in part on the identities of the end-terminals, the proxy application 220 has access to a configuration file 225 storing such information as the addresses of the different end-terminals and other proxy devices. The configuration file 225 also contains information about the second proxy device 145 and may contain further information about other aspects of the network. The configuration file 225 can be reconfigurable and can be maintained automatically, and/or manually by a network manager.

Figure 3:
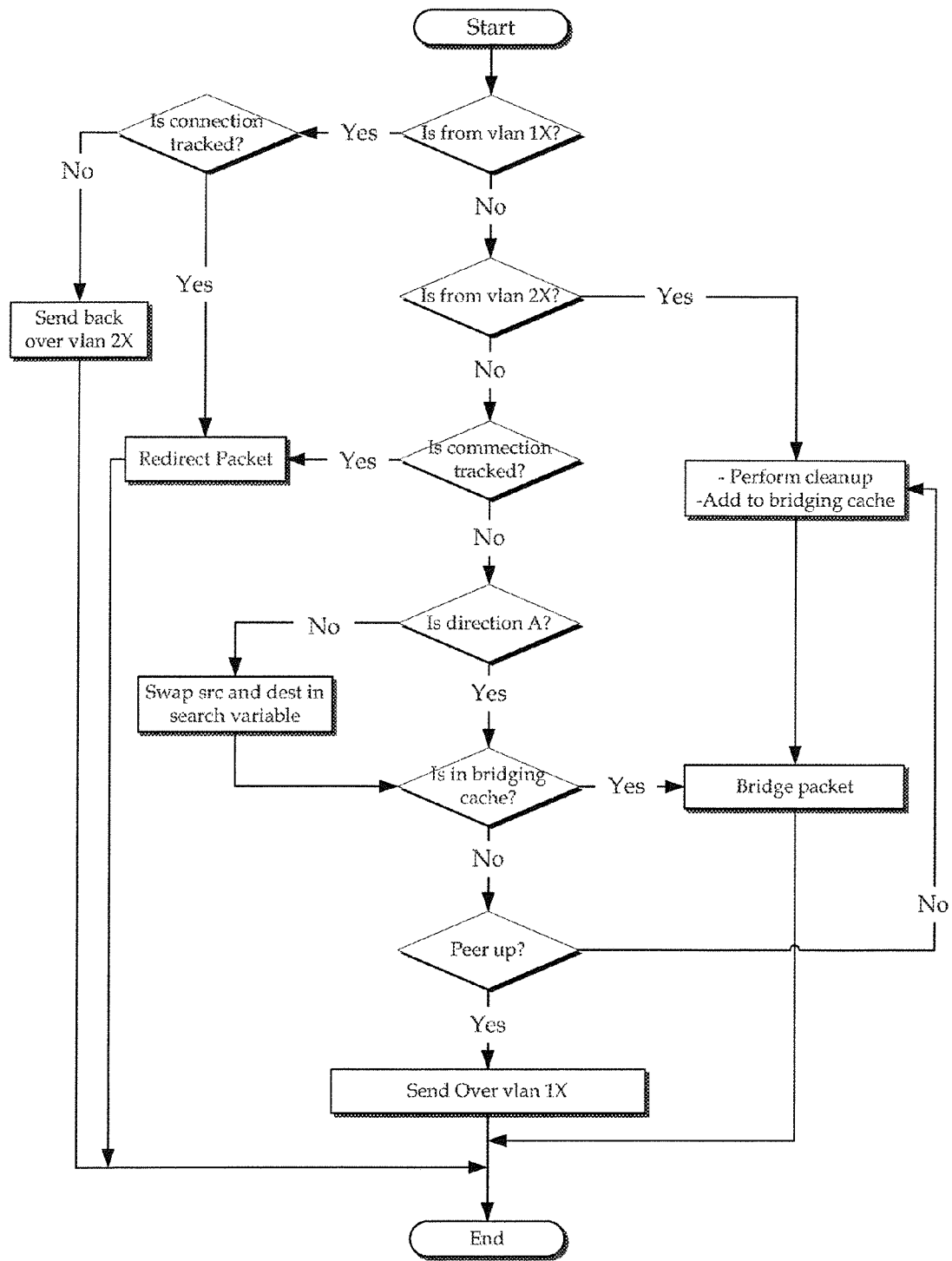
FIG. 3 is a flow diagram illustrating how LAN packets are processed.

A flow diagram of an exemplary embodiment of the invention is illustrated in FIG. 3. In general, a proxy device, such as a TCP proxy terminates a local connection on one side and terminates a remote connection on the other side. As shown, a proxy device 115 receives a communication (e.g., a packet). The device 115 determines which communication path (e.g., TCP connection—virtual LAN 1 or 2) the communication is associated with. Once identified, the device 115 determines whether the related connection is being tracked by the device 115. If the connection is being tracked, the packet is redirected.

A packet may be received from local end-terminals at first proxy device 115's LAN interface 210. A packet may also be received from a remote end-terminal at first proxy device 115's WAN interface 215.

For example, if first proxy device 115 receives a packet at its LAN interface 210, the device 115 inspects certain information within the packet to identify features of the packet. These features may include the packet source, its destination, a port number, or the contents of the packet itself. Once identified, the device 115 will determine whether the identified packet should be processed by the proxy device 115. If the device 115 determines that it should process the packet, it next determines whether the packet belongs to one of any number of active sessions then currently being processed by the proxy device 115, or whether the packet is intended for a new connection.

If the proxy device 115 determines that the identified packet belongs to an active session, then the proxy device 115 processes the packet, forwarding the packet to its intended destination via the WAN interface 215. For example, the packet can be redirected to the proxy application. However, if the proxy device 115 determines that the identified packet does not belong to any of the active sessions, the packet will be forwarded to the second proxy device 145 over the interconnecting communications link 155.

If a packet is received on a peer interface of the first proxy device 115 from a second proxy device 145, and if the packet was originally sent from the first proxy device 115 to the second proxy device 145, then the first proxy device 115 bridges the packet by establishing an active connection for the packet to be managed by the first proxy device 115, and by further forwarding the packet to an end terminal device. Otherwise, the first proxy device 115 determines if the received packet belongs to one of its active connections. If it does, the first proxy device 115 processes the packet. However, if the packet does not belong to one of the first proxy device's active connection, the first proxy device 115 passes the packet back to the second proxy device 145 using the peer interface.

Similarly, for example, if first proxy device 115 receives a packet from a TCP connection over WAN 125, first proxy device 115 inspects certain information within the packet to identify features of the packet. These features may include those described above, such as packet source, its destination, a port number, or the contents of the packet itself. Once identified, first proxy device 115 will determine whether the packet is part of a flow being handled by another proxy device. If so, first proxy device 115 can ignore the packet, allowing the other device to handle routing of the packet. However, if first proxy device 115 determines that the packet is being handled by itself, then first proxy device 115 can refer to any applicable policies to determine how to forward the packet. For example, if first proxy device 115 receives a packet that it is tracking and determines that this packet should be forwarded to an end-terminal associated with second proxy device 145, then first proxy device 115 may forward the packet across communications link 155 to second proxy device 145. Second proxy device 145, in turn, receives the packet, identifies it, checks its policies, and forwards the packet to the intended end-terminal destination.

The packets can be passed on to the device responsible for processing that specific TCP flow in one of several ways. For example, the packet can be passed using a direct connection or encapsulating it into a protocol. In this manner, the overlay network between inline devices can be used to reconstruct the TCP packet flows by inspecting the packet, determining if the inspected packet is part of a flow that was previously determined should be intercepted, and passing the packet to the device responsible for processing that specific TCP flow.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

In some embodiments, the network architecture can include a network acceleration feature as described in co-pending U.S. patent application Ser. No. 10/354,438 filed in the U.S. Patent office on Jan. 29, 2003 and issued on Oct. 24, 2006 as U.S. Pat. No. 7,126,955, and incorporated herein by reference in its entirety.

Appendix A, also incorporated herein in its entirety, describes one embodiment of a proxy's capability that can support the above-described seamless redirection of connection-oriented communications between end-terminal devices in an IP-based network.

Appendix B, also incorporated herein in its entirety, describes one embodiment of a redundancy architecture.

While this invention has been particularly shown and described with references to preferred embodiments thereof, it will be understood by those skilled in the art that various changes in form and details may be made therein without departing from the scope of the invention encompassed by the appended claims.

Appendix A to

Obtaining High Availability Using TCP Proxy Devices

1. Overview
2. Application threads
2.1 Main Thread
2.2 LAN listen thread
2.3 New connection completion thread
2.4 Proxy listen thread
2.5 Working thread
2.6 Socket queue threads
2.7 Handling Connection Port reset
2.8 StatusCheck Thread
2.9 Proxy Protocol
3. NIXTonnection
3.1 Handling LAN stream
3.2 Handling proxy stream
3.3 Handling TOS value change
4. Memory Management (Memory Checks)
5. File Descriptors
6. Socket Options
7. Proxy Connection Reuse
7.1 Data structure
7.2 Adding a connection to the pool of unused connections
7.3 Requesting a new connection
7.4 Remove least used connections
7.4.1 Removing connections from main array
7.5 Unused Connection pinging
8. Connection Establishment Timeout
9. Diagnosis check
1. Overview The Generic proxy application is responsible for data redirection between a LAN connection and its corresponding proxy connection.

The proxy application communicates with the Generic Proxy module (which is responsible for packet redirection) to add a connection, delete a connection, reset a connection, and add local port information to which LAN connections are to be redirected.

2. Application Threads

Figure 4:
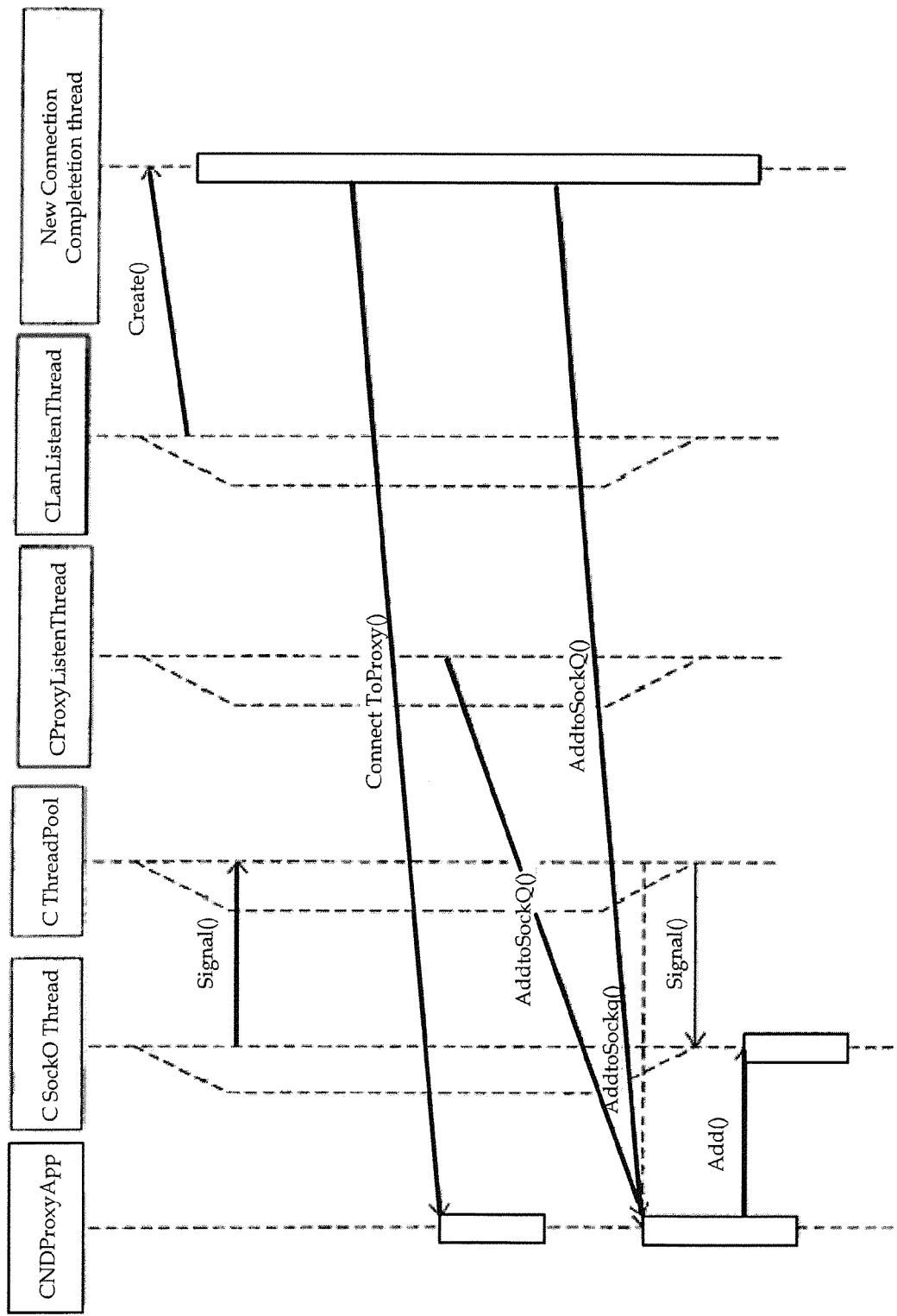
FIG. 4 shows one embodiment of application threads.

FIG. 4 shows one embodiment of application threads.

2.1. Main Thread

The main thread is responsible for the initialization and creation of all other threads. It initializes the proxy module with the information loaded from the configuration file. It also checks for the physical memory size in order to determine the following:

Number of working threads
A maximum number of file descriptors available to the application
Number of socket queue threads needed.

The application may have one of three possible configurations:

| Physical Memory Size | Number of working threads | Number of socket queue threads | Maximum number of file descriptors | Number of concurrent connections |
|---|---|---|---|---|
| 512 MB | 225 | 5 | 2048 | 450 |
| 1024 MB | 300 | 10 | 4096 | 1000 |
| 4096 MB | 2000 | 40 | 8192 | 4000 |

However, the invention is not limited to these values, and others may be used as well. The main thread creates a proxy listen socket with the port number read from the configuration file. It then creates the working threads, LAN listen thread, proxy listen thread and socket queue thread. The thread will eventually listens on, for example, port 51999 for the syscheck command.

2.2. LAN Listen Thread

The LAN listen thread may create about 300 ports to listen on. It then checks for new connections about every 5 seconds. This may be done using a call to select for the about 300 sockets for a timeout of about 5 seconds.

Figure 5:
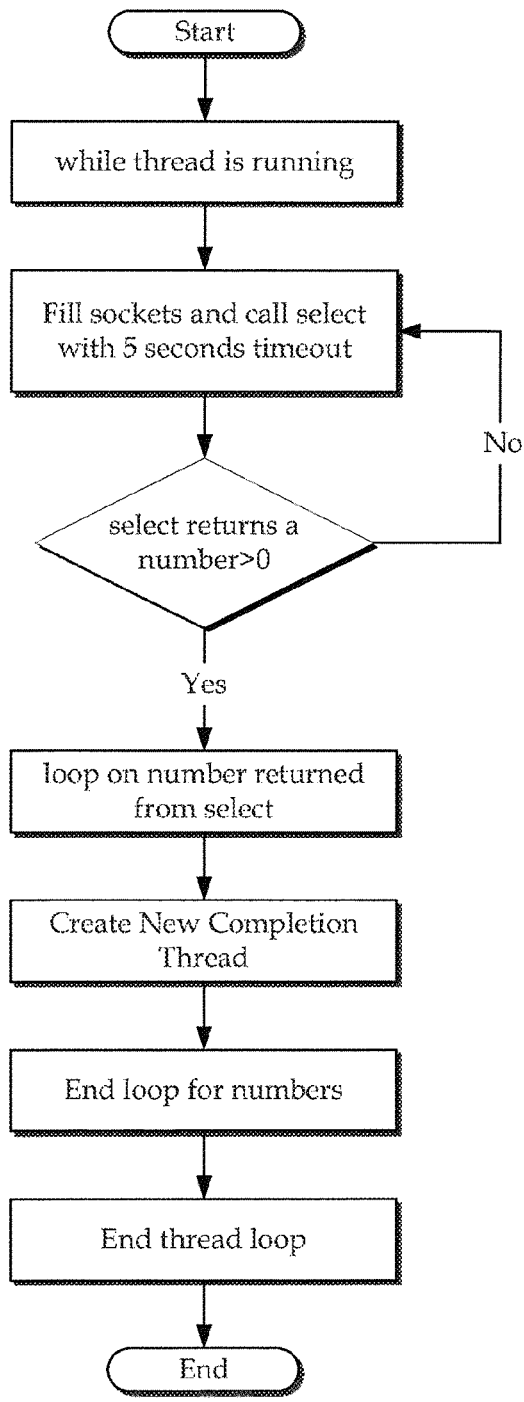
FIG. 5 is a flow diagram of one embodiment of a LAN listen thread.

FIG. 5 is a flow diagram of one embodiment of a LAN listen thread.

2.3. New Connection Completion Thread

This thread searches for the proxy corresponding to the new LAN connection and then tries to establish a connection to that proxy over which it sends a begun message.

If the connection fails, the thread informs the proxy module to remove this connection and then sends a reset packet to the client.

Prior to sending the begin message, the thread may check the LAN connection for data. If data is detected, it reads up to about 1400 bytes and sends the data along with the begin message in one stream. The invention is not constrained to 1400 bytes, and another size may also be read. The thread then adds the new NDConnection object to socket queue thread and terminates.

An NDConnection object represents the connection pair of a LAN connection and its corresponding proxy connection.

Figure 6:
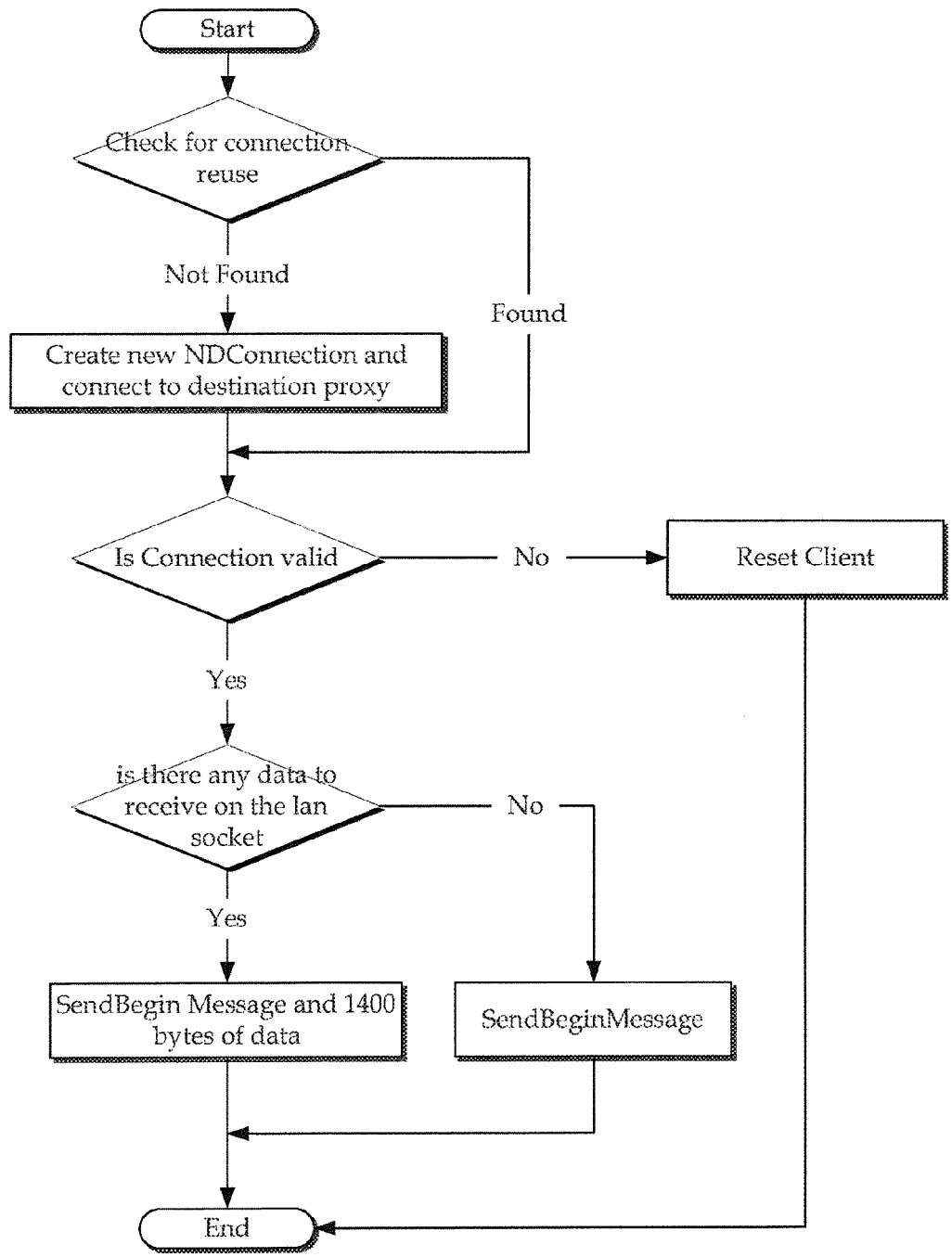
FIG. 6 is a flow diagram of one embodiment of a new connection completion thread.

FIG. 6 is a flow diagram of one embodiment of a new connection completion thread.

2.4. Proxy Listen Thread

This thread waits on Accept until a new connection request is received. When a connection is received it creates an NDConnection and adds it to the socket queue thread.

2.5. Working Thread

The working thread is responsible for handling an NDConnection. The thread handles one stream for that connection.

The working threads are created once on the application initialization by the plain thread; their number depends on the total memory of the box (see section 2.1).

The thread waits on an event to be signaled.

This thread is signaled from socket queue thread.

The Thread uses a buffer for data between connections either for send or receive for both proxy and client connections. In one embodiment, the buffer is about 120K in size.

Figure 7:
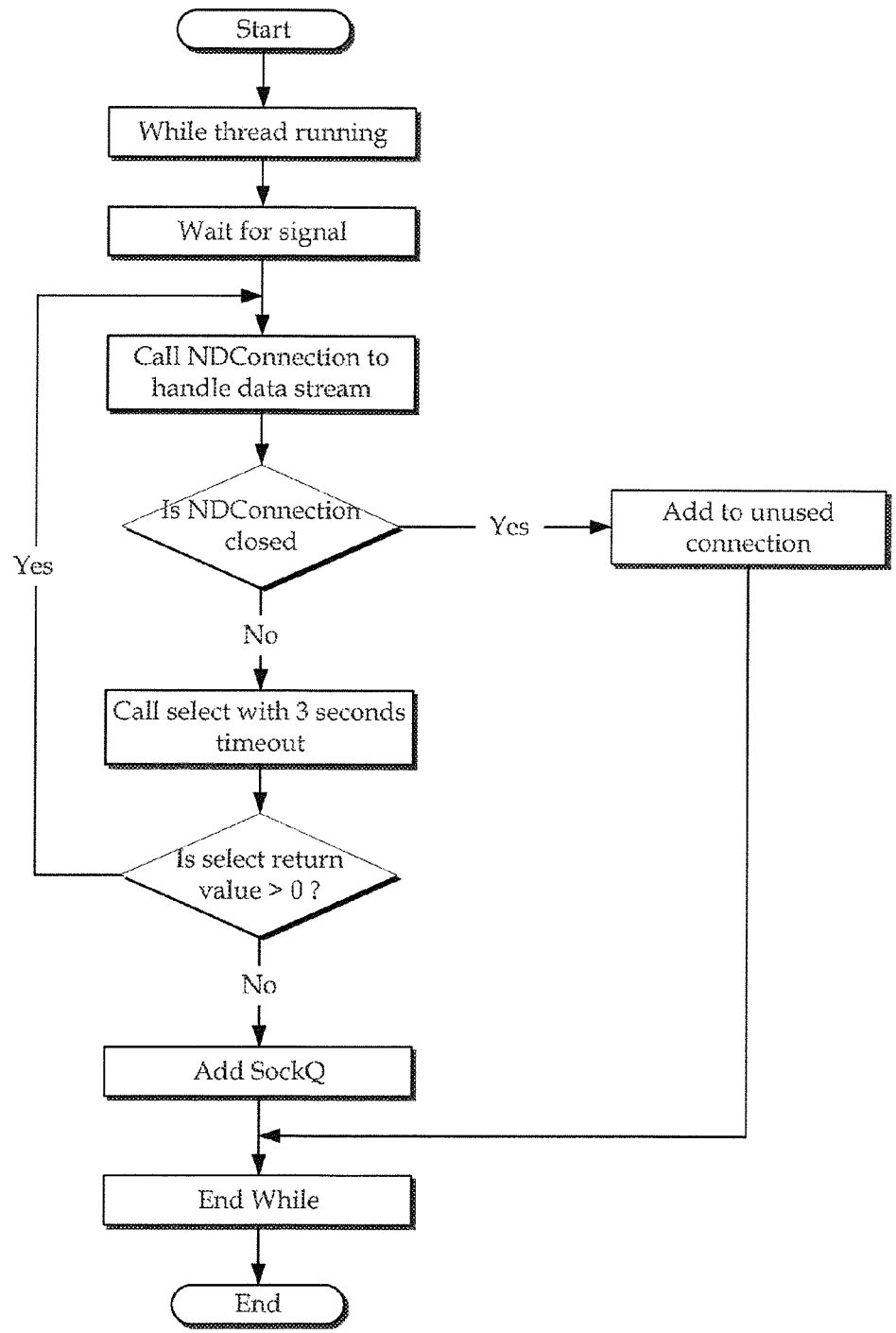
FIG. 7 is a flow diagram of one embodiment of a working thread.

FIG. 7 is a flow diagram of one embodiment of a working thread.

2.6. Socket Queue Threads

Socket queue threads are responsible for checking for data availability on a socket. If data is received on a socket, the socket queue thread gets a free working thread, set the information needed by the working thread then signals the working thread to start handling the connection.

Each Socket queue thread handles connections and owns (n) working threads. In one embodiment, each Sock queue thread may be configured to handle a maximum number of connections, such as about 100 connections.

Figure 8:
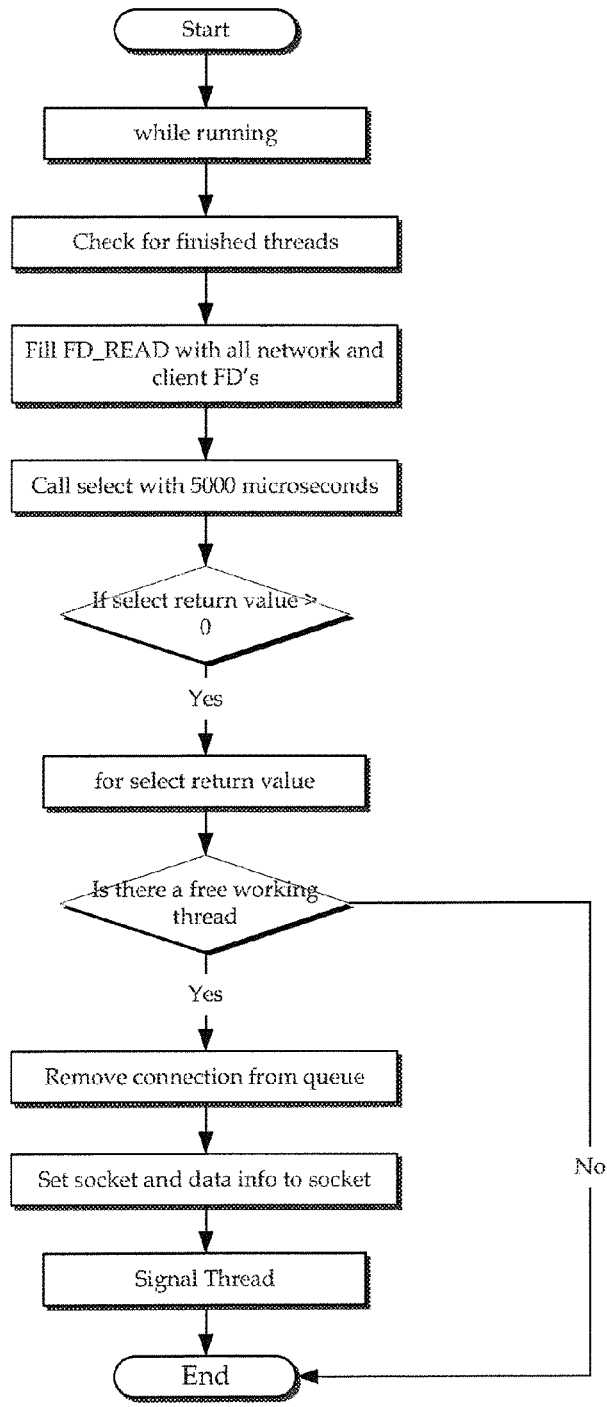
FIG. 8 is a flow diagram of one embodiment of a socket queue threads.

FIG. 8 is a flow diagram of one embodiment of a socket queue threads.

2.7. Handling Connection Port Reset

Connection port reset may be used to send rst packet to SOURCE client A requesting to connect to unavailable destination IP or port.

CConnectionReset class is responsible for loading reset port list and maintaining the added connections.

LAN Client A requests to connect to LAN Client B

Box A routes Client A connection and accepts it.

Box A connects to Box B.

Box B tries to connect to LAN Client B.

If the connection fails, the WAN connection is closed.

Box A adds this connection information to CConnectionReset class.

CConnectionReset class checks if the destination port is listed in the reset port list.

If the port is found, CConnectionReset class adds this connection to an internal list along with a timeout value. Then calls the Module to add the connection information. So when a new request from LAN A to LAN B is issued the module sends a rst packet.

CConnectionReset class check every one second its internal list to check the connections timeout, when the timeout of a connection expires it calls the module to remove it.

2.8 StatusCheck Thread

This thread is responsible for checking on genericproxy integrity, if the system is working fine, it changes a shared memory value which indicates that its working. ICheck checks this value to insure system integrity.

If any checks failed for some pre-defined number of times the thread is terminated and ICheck reboots the machine. In one embodiment, the pre-defined number of times may be sent to 3; however, the invention is not so constrained, and other values may also be used.

2.9. Proxy Protocol

The proxy protocol may be a 4 bytes header which indicates the type of stream following the header:

A) If the most significant bit is set, this indicates a Code; the low word may hold one of the following code numbers:

| Code No. | Name | Parameters | Parameters length |
|---|---|---|---|
| 1 | Begin Message | Src IP:Port DST IP:Port Initial TOS | 13 |
| 2 | End Message | <None> | 0 |
| 3 | Error Message | Error Type | 1 |
| 4 | OOB Message | <None> | 0 |
| 5 | Auth1 | <None> | 0 |
| 6 | Auth2 | <None> | 0 |
| 7 | Reuse Ready | <None> | 0 |
| 8 | Ping | <None> | 0 |
| 9 | TOS_CHANGE | TOS value | 1 |

B) If the most significant bit is clear this may indicate that the following stream is data and the least 19 bits are the size of the stream.

3. NDConnection

An NDConnection object holds a pair of socket objects representing a LAN/Proxy connection pair. It is responsible for the handling and forwarding of data over the LAN and proxy connections.

An NDConnection object may be exclusively owned by one thread at a time; i.e., when a thread passes an NDConnection object to another thread, it first unbinds all references to the object from the thread object's member variables.

When a stream (block) is received over the LAN connection, the thread propends a header containing the size of the stream (block) and then sends the stream (block) to the related remote proxy over the proxy connection.

When the stream (block) is received by the proxy, the header is parsed; the header will contain either a protocol code or the data size, If a begin code is detected, the proxy adds the connection information to the proxy module to enable redirection. It then connects to the corresponding LAN connection. LAN connection information is sent within the begin packet.

If, on the other hand, an end code is detected, the proxy shutdown the corresponding LAN connection and waits till the LAN client closes its connection to send end code to the remote proxy. If the connection owner receives end code and its LAN connection is closed it waits for reuse code. If the connection is not owned and end code is received and its LAN connection is closed a reuse code is sent to the other proxy.

In error code will cause the proxy to query the proxy module to get information about the connection. It then uses the returned information to reset the connection.

The NDConnection object is then destroyed.

If reuse code is received the connection is moved to connection reuse.

3.1. Handling LAN Stream

Figure 9:
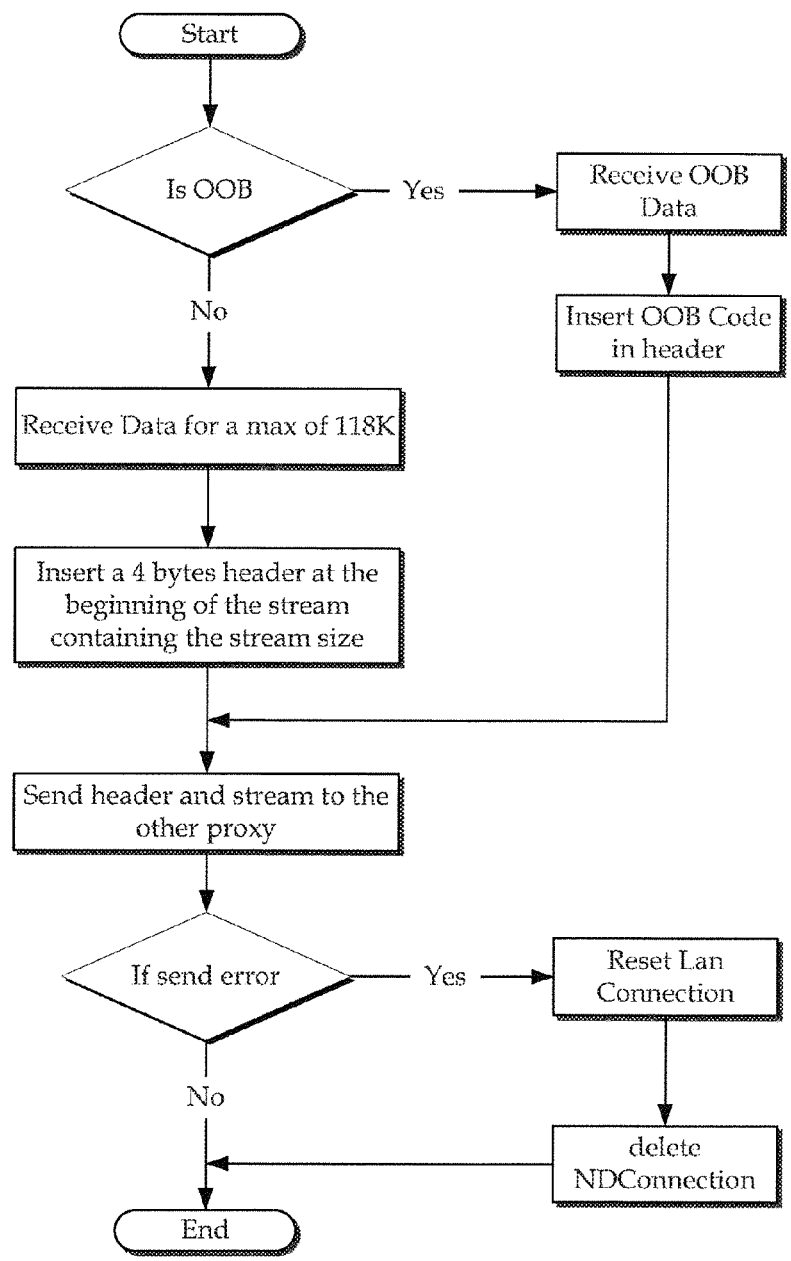
FIG. 9 is a flow diagram of one embodiment for handling LAN stream.

FIG. 9 is a flow diagram of one embodiment for handling LAN stream.

3.2. Handling Proxy Stream

Figure 10:
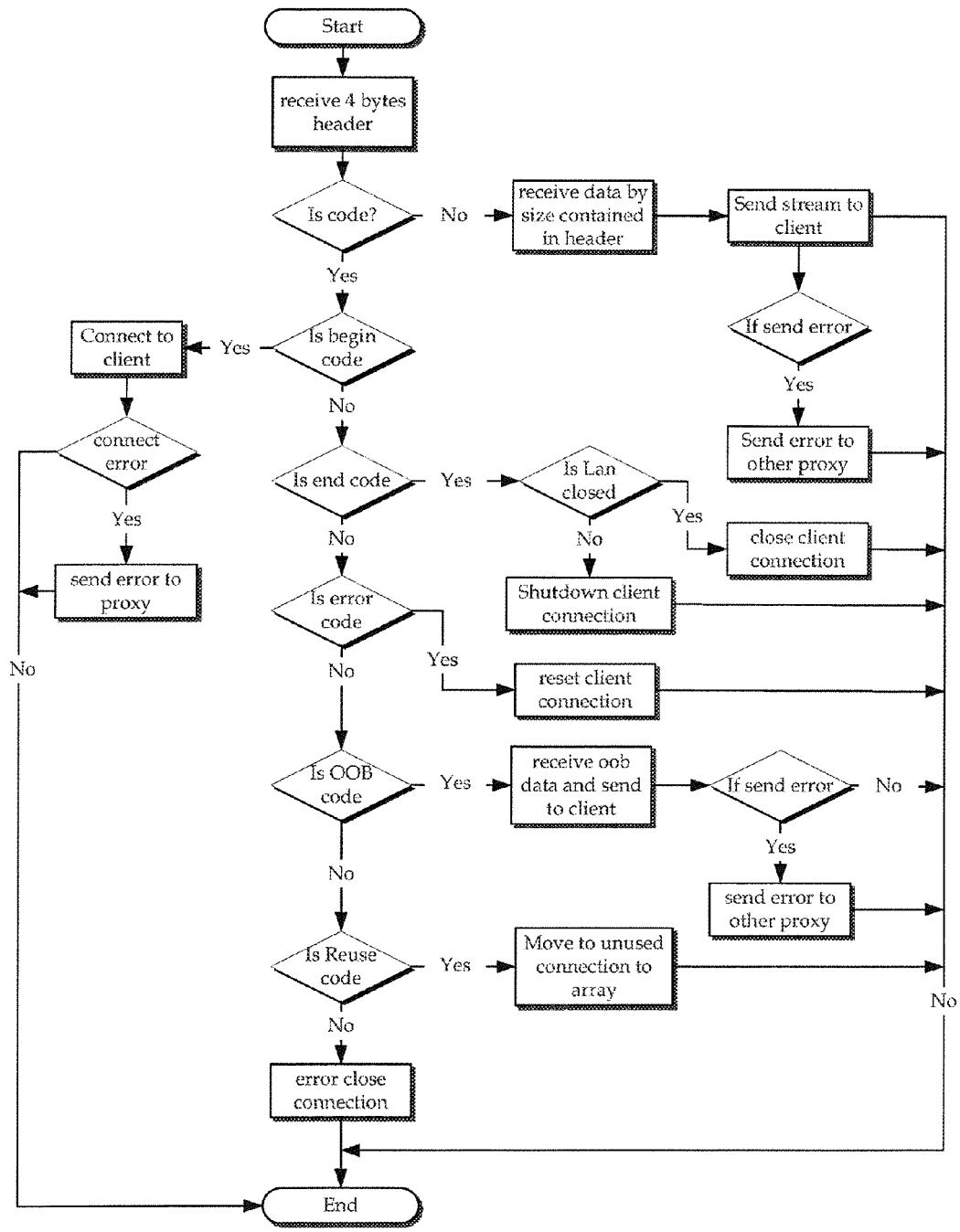
FIG. 10 is a flow diagram of one embodiment for hangling proxy stream.

FIG. 10 is a flow diagram of one embodiment for hangling proxy stream.

3.3. Handling TOS Value Change

The TOS is set per port per remote Box. CTOSVal class is responsible for loading TOS values and searching for the appropriate value for a specific LAN connection.

How may the TOS value be set:

a) Search for TOS value using remote box EP, Destination port.

b) If value found return the value to the caller.

c) If value not found search in the SOURCEPORTS.

d) If port found return the corresponding TOS value.

e) If not found return the default value.

4. Memory Management (Memory Cheeks)

The new and delete overloaded operators are overloaded to check the availability of free memory. They also ensure that the application does not run out of memory by freeing up unused application objects. A list keeps track of the allocated objects and their sizes.

The overloaded new operator checks if the available memory is not less than about 30 M. if true, it tries to free memory by closing unused connections; if the available free memory is then still less than about 30 MB, it may fail and throw exception. However, another size may also be selected.

The overloaded delete operator checks if the passed address to be deleted has an entry in the list of allocated objects; if no entries are found, it fails and throws an exception. If, however, the address is in the list, the operator frees the memory referred to by the address and removes the related entry from the list.

Figure 11:
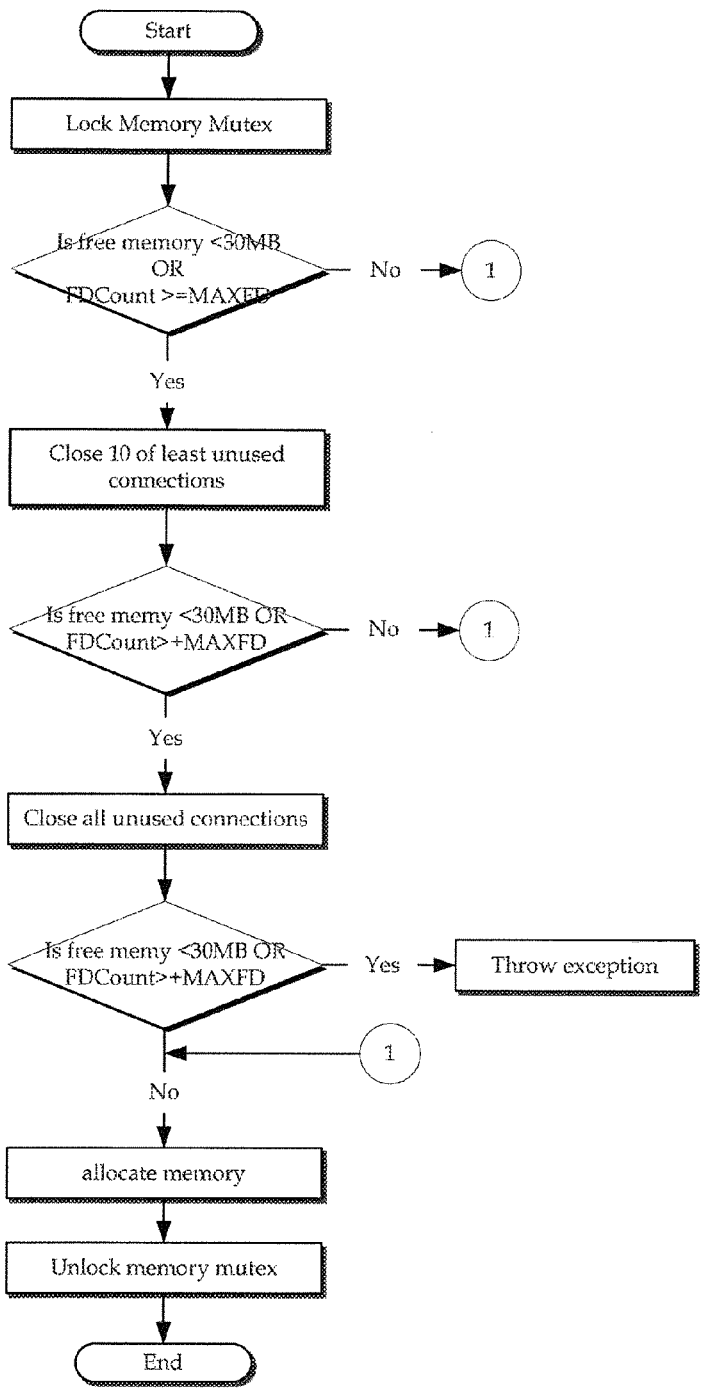
FIG. 11 is a flow diagram of one embodiment of memory management.

FIG. 11 is a flow diagram of one embodiment of memory management.

5. File Descriptors

[The maximum file descriptors allowed per process (max FD) in Linux is currently to about 1024, max fd is changed to about 4096 and the kernel was recompiled and the application had to be recompiled with the new headers.]

In order to overcome the Linux limit on maximum file descriptors (max FD) per process (1024), the kennel was recompiled to allow a maximum of about 4096. (The application also had to be re-compiled with the new headers)

The application uses about 73% of the max FD for LAN/Proxy connections while the rest is used for files, authentication and link down detection.

The application keeps track of the count of currently used FDs for all connections; if the FD count exceeds the percentage allowed, 200 unused connections are closed.

The check is done at three different locations in the code:
1) Memory allocation checks
2) LAN listen thread
3) Proxy listen thread If the check fails after closing the unused connections, in the case of a memory allocation check, the allocation fails and new throws an exception. The newly accepted connection is dropped in the case of LAN and proxy listen threads.

6. Socket Options

Two socket options may be used: TCP NODELAY and SO KEEPALIVE.

Sockets representing the proxy-to-proxy connections have, their TCP_NODELAY option set. This option disables the Nagel algorithm, which speeds up the transfer of small packets.

Sockets representing proxy-to-client connections have their SO_KEEPALIVE option set.

7. Proxy Connection Reuse

Proxy connection reuse aims at reusing each proxy-to-proxy connection to service multiple, consecutive client-to-client connections. This has the advantage of reusing the compression dictionary (created by the compression module for each proxy-to-proxy connection). Proxy connection reuse also reduces the overall time overhead for client-to-client connection establishment. Such overhead may be caused by establishing a TCP proxy-to-proxy connection for each client connection.

The proxy maintains a pool of unused connections to other proxies. Each unused connection entry has a field that indicates the original destination port (i.e., the destination port as seen by the originating client). When a client "connect" is detected, the proxy searches for the proxy responsible for the destination client. It then starts searching for an unused connection to the found proxy based on the destination port. A similar destination port implies that both connections run the same protocol.

7.1. Data Structure

Figure 12:
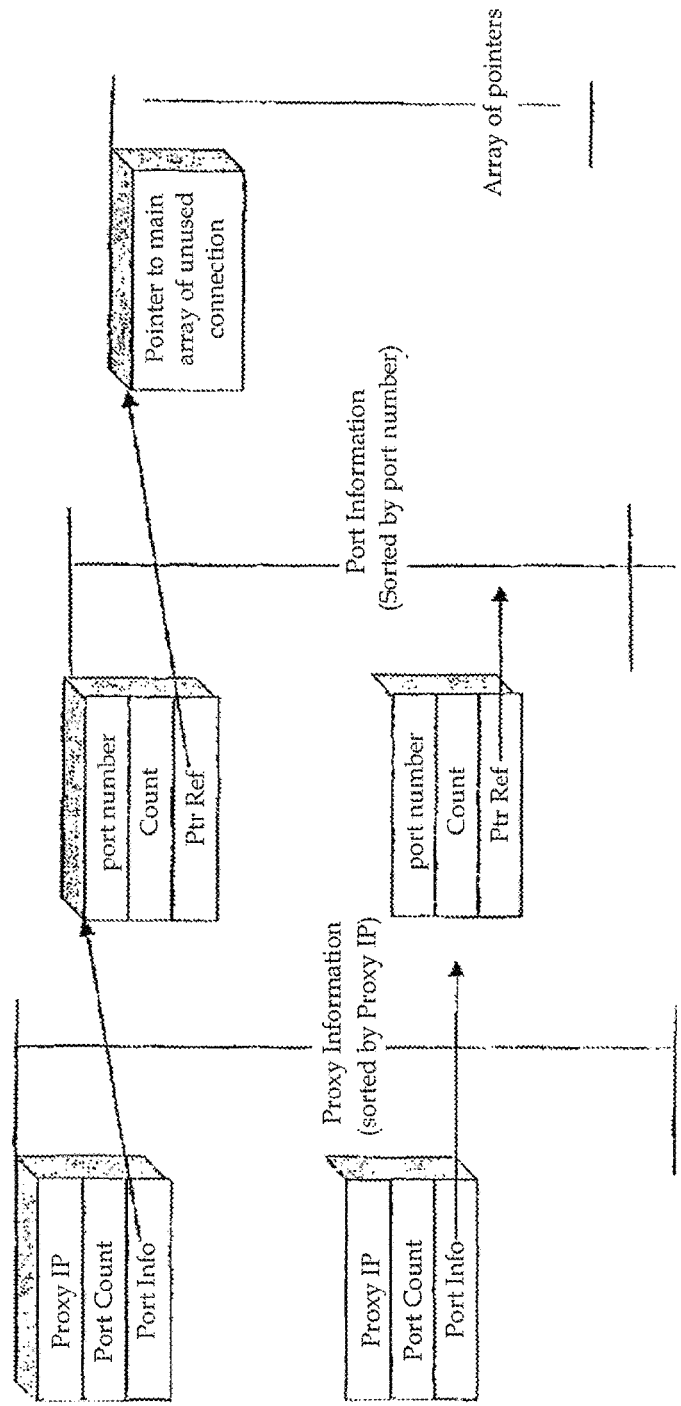
FIG. 12 shows one embodiment of a data structure.

FIG. 12 shows one embodiment of a data structure.

Unused connections are stored in a multi-level sorted data structure. Proxy info is stored in an array sorted by their IP addresses. Each entry in the array represents a remote proxy (ProxyInfo). A proxy entry has a reference to yet another array (PortInfo) with entries representing ports. The port array is sorted by port numbers. Each port entry points to a list of unused connections.

7.2. Adding a Connection to the Pool of Unused Connections

When a client connection is closed, the proxy uses a binary search to get a reference to the proxy IP from the ProxyInfo array. Next, a destination port entry is looked up for in the PortInfo array. If no matching entries are found, a new entry is created and the PortInfo array is binary-sorted. Next, a reference to the unused connection is added to the PortInfo entry.

Figure 13:
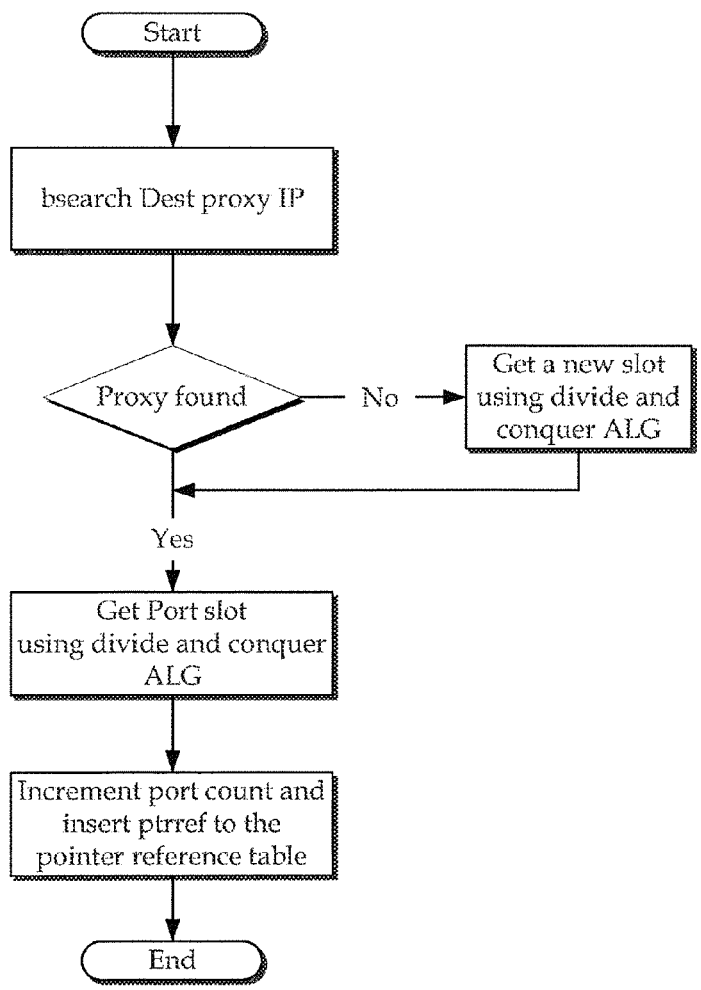
FIG. 13 is a flow diagram of one embodiment for adding a connection to the pool of unused connections.

FIG. 13 is a flow diagram of one embodiment for adding a connection to the pool of unused connections.

7.3. Requesting a New Connection

When a new connection is requested, a search in the proxy info may be made using, for example, a binary search algorithm. If the proxy IP is found a search for the port number is made in the port info using, for example, the binary search algorithm. If any search fails, NULL is returned to indicate that new unused connection matches the previous information and thus a new connection is made.

Figure 14:
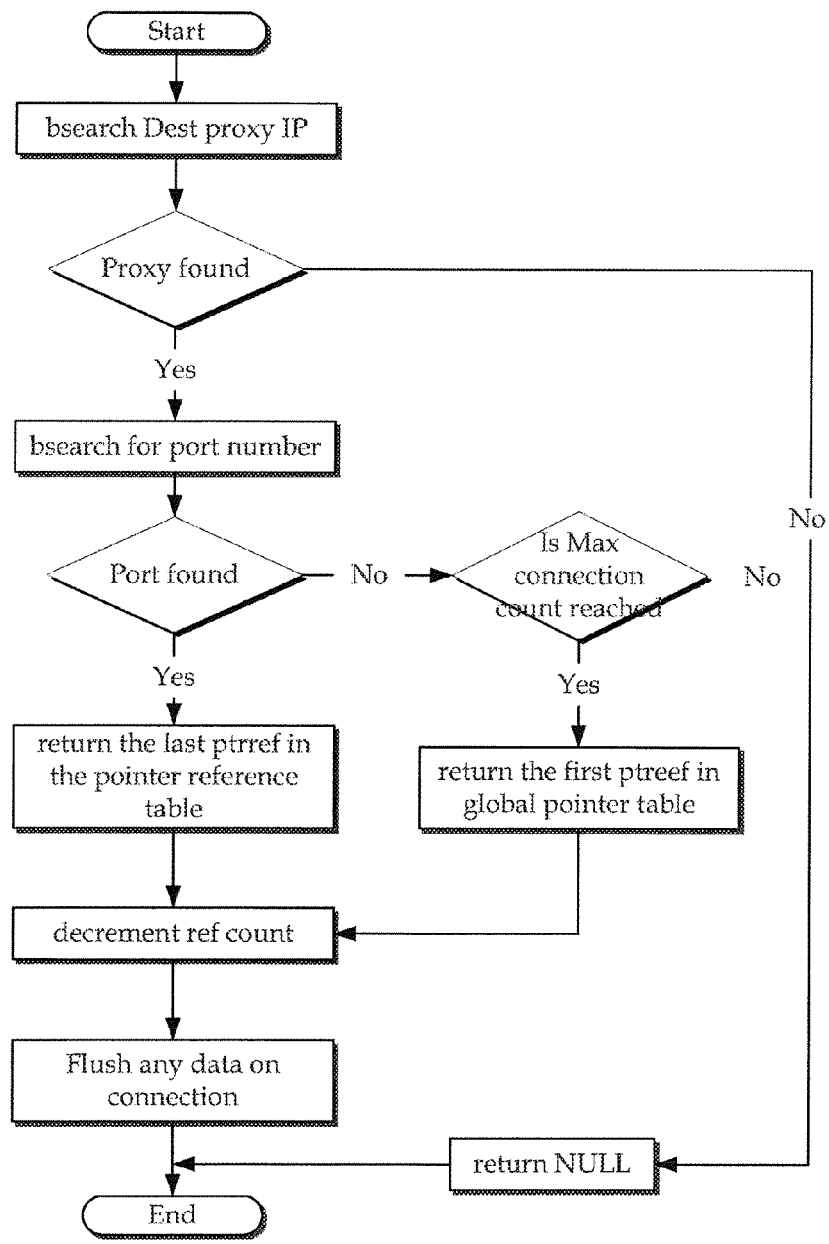
FIG. 14 is a flow diagram of one embodiment for requesting a new connection.

FIG. 14 is a flow diagram of one embodiment for requesting a new connection.

7.4. Remove Least Used Connections

Removing least used connections may be called when free memory is less than some size, such as about 30 MB or File descriptors exceed about 73% of file descriptors allowed per process (2048).

7.4.1. Removing Connections from Main Array

Figure 15:
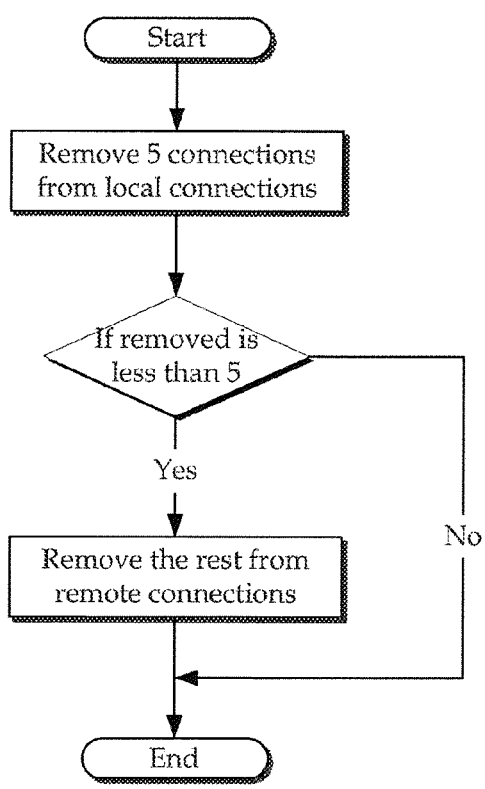
FIG. 15 is a flow diagram of one embodiment for removing connections from main array.

FIG. 15 is a flow diagram of one embodiment for removing connections from main array.

7.5. Unused Connection Pinging

The proxy owning unused connections send ping command on every connection every predefined number of minutes to ensure that the connection is still valid and because firewalls closes idle connections after some predetermined time, such as about 2 hours. In one embodiment, the predefined number of minutes may be set to about 55 minutes, or so.

Figure 16:
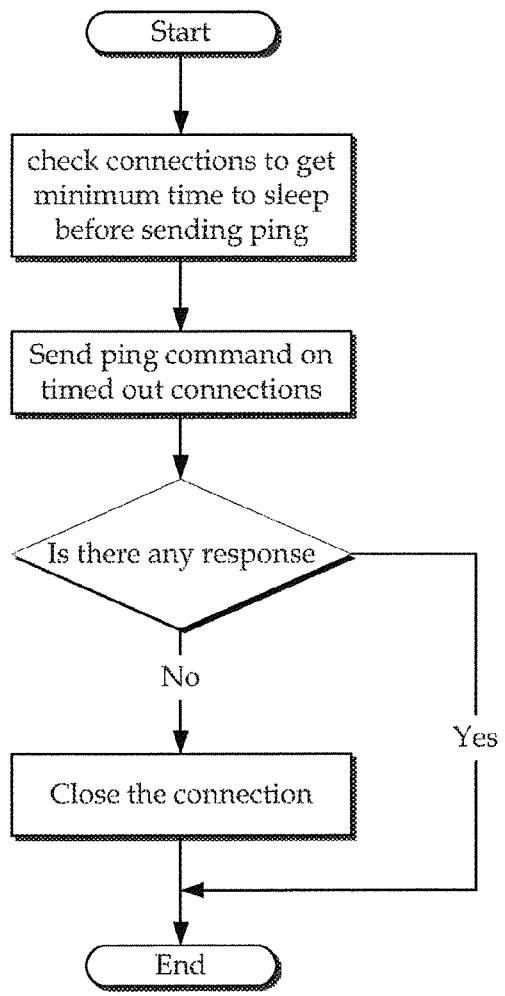
FIG. 16 is a flow diagram of one embodiment of unused connection pinging.

FIG. 16 is a flow diagram of one embodiment of unused connection pinging.

8. Connection Establishment Timeout

The connection establishment timeout is set to some predefined number of seconds for connections between the proxy boxes while the connection timeout is set to another predefined number of seconds for connections between the proxy box and the client. In one embodiment, the connection establishment timeout may be set to about 120 seconds, while the connection time out may be set to about 60 seconds.

9. Diagnosis Check

Diagnosis check is done by another process. The process communicates with the proxy application through socket API's to check on the proxy status.

The process check for proxy scheduler about every 2 minutes. LAN listen thread about every 3 minutes and working threads about every 60 minutes. However, the invention is not so constrained, and other values may be used, without departing from the scope or spirit of the invention.

If any of these checks failed the heart beat thread is stopped.

Appendix B to

Obtaining High Availability Using TCP Proxy Devices

One Possible Embodiment of a Redundancy Architecture

Figure 17:
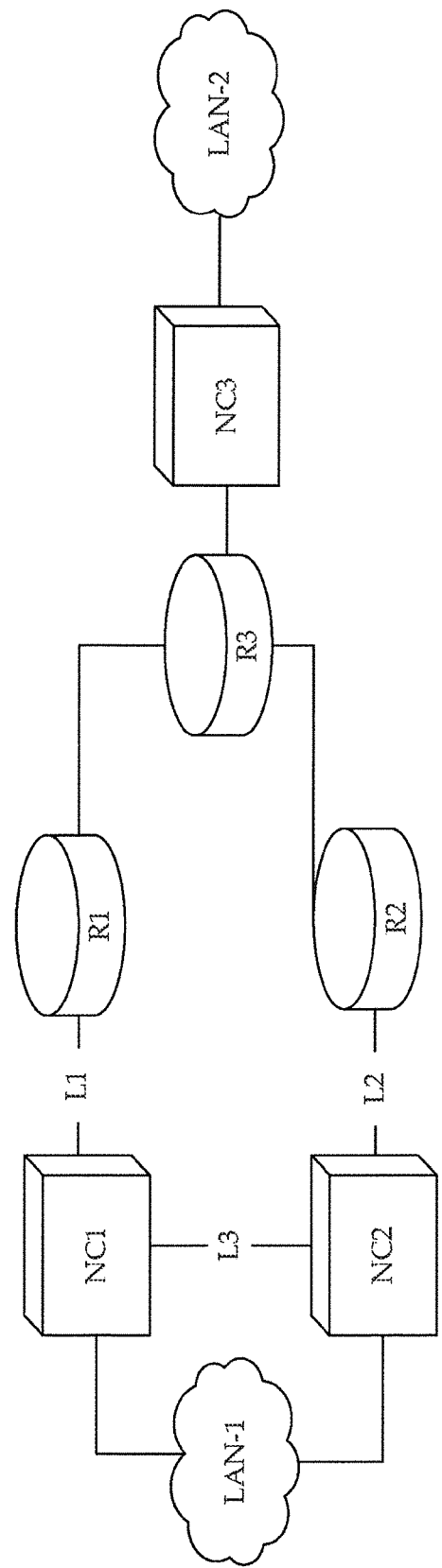
FIG. 17 shows one embodiment of a redundancy architecture.

FIG. 17 shows one embodiment of a redundancy architecture.

We have four types of connections,
1—Bridged LAN1->LAN2
2—Bridged LAN2->LAN1
3—Proxied LAN1->LAN2
4—Proxied LAN 2->LAN1

1. Solution:
1. An extra gigabit Ethernet link L3 may be added between NC1 and NC2; the two Ethernet devices at both end of L3 will be set to promiscuous mode.
2. The L3 will be a trunk link with 5 VLANs; 4 tagged and one untagged 3. NC1, NC2 will be aware of each other as redundant NCs. They may exchange heartbeat packets.
4. There will be a cache for bridged connection: bridge-cache 2. Checks:
I. Packets coming from the LAN-1side, or L1/2 N/C may undergo the following checks:
1. If the packet is a SYN packet, it will be checked against the redirection rules
  A) If a matching rule is found, it will be redirected
  B) Otherwise, it will be added to the bridge-cache and bridged
2. If the packet is a non-SYN packet, it will be checked against the tracked connection records
  A) If a matching record is found, it will be redirected
  B) The packet is checked against the bridge-cache, if a hit is found it's bridged
  C) Otherwise, it will be forwarded over L3
II. Packets coming from the L3 NIC may undergo the following checks:
1. If a tagged packet is received, it may be added to the bridge-cache and transmitted to the router link (L1 or L2)
2. If the packet belongs to a tracked connection, it may be redirected to the proxy application
3. If the packet doesn't belong to any of the tracked connection it may be tagged and forwarded back over L3

3. Scenarios:
1. R1 active, R2 standby
2. A) R1 active, R2 standby B) The L1 Link becomes down
   R1 is up and in active mode
   L1 becomes down and R1 enters standby mode
3. A) R1 is active, R2 is standby B) NC1 becomes down
4. A) L1 is down, R1 is standby, R2 active B) L1 becomes up, R1 active, R2 standby Scenario 1:
1. Bridged LAN1->LAN2 LAN1->NC1->L3->NC2->L3-> NC1->L1->R1
2. Bridged LAN2->LAN1 R3->R1->L1->NC1->L3->NC2->L3->LAN1 OR R3->R2->L2->NC2->L3->NC1->L3->LAN1
3. Proxied LAN1->LAN2 LAN1->NC1->R1
4. Proxied LAN2->LAN1 R3->R1->NC1->LAN1

Scenario 2:
A) R1 active, R2 standby
  Refer to Scenario 1
B) L1 link becomes down
1. Bridged LAN1->LAN2 LAN1->NC1->L3->NC2->L2->R2
2. Bridged LAN2->LAN1 R3->R2->L2->NC2->L3->NC1->L3->NC2->LAN1
3. Proxied LAN1->LAN2 LAN1->NC2->L2->R2 OR LAN1->NC2->L3->NC1->L1->X (Dropped) (connections used to get proxied by NC1 is handled as case 1)
4. Proxied LAN2->LAN1 R3->R2->L2->NC2->LAN1

Scenario 3:
Handled the same was as Scenario 2

Scenario 4:
A) R1 active, R2 standby
  Refer to Scenario 1
B) L1 becomes up, R1 active, R2, standby
1. Bridged LAN1->LAN2 LAN1->NC1->L3->NC2->L3-> NC1->L1->R1
2. Bridged LAN2->LAN1 R3->R1->L1->NC1->L3->NC2->L3->LAN1 OR R3->R2->L2->NC2->L3->NC1->L3->LAN1
3. Proxied LAN1->LAN2 LAN1->NC1->L1->R1 OR LAN1->NC1->L3->NC2->L2->R2
4. Proxied LAN2->LAN1 R3->R1->L1->NC1->LAN1 OR R3->R2->L2->NC2->LAN1

4. Hardware Requirements
  1 Gigabit Ethernet NIC
  1 CAT 5e crossover cable

5. System Configuration
  Each NCRA box will have 5 extra devices, eth2, eth2.10, eth2.11, eth2.20, eth2.21
  There will be four bridges: br10 with eth2.10 as its only port br11 with eth2.11 as its only port br20 with eth2.20 as its only port br21 with eth2.21 as its only port Bridges are used in order to enable Netfilter to intercept promiscuous frames 6. Configurable Parameters
  NCRA: Enabled/Disabled
  NCRS own/peer IP address 7. A Detailed Software Design Embodiment. Netfilter PRE-ROUTING Check
  The NCRA checks will be added to the GPMod PRE-ROUTING hook (hookpreroute)
  VLAN 10 will be used to send packets coming from bridge port 0 for checking on a remote proxy
  VLAN 11 will be used to send packets coming from bridge port 1 for checking on a remote proxy
  VLAN 20 will be used to send packets back when the above check proves false (coming from VLAN 10)
  VLAN 21 will be used to send packets back when the above check proves false (coming from VLAN 11)
  An arbitrary network device (one of bridge ports) will be used as a direction reference (Direction A); packets coming from the other network device will be checked with their source and destination addresses swapped. This applies only to the bridging cache check.

The Bridging Cache
  The bridging cache will be implemented a hash table [MODULE]
  Bridging cache connection entries will have a timeout of 120 secs
  Cache cleanup will be performed every 45 seconds, upon connection addition.
  The following flowchart illustrates the flow of code:
  Error! No topic specified.

Heartbeat
  Heart beat connections will be exchanged over the eth0 untagged link. Heartbeat data will be exchanged using the authentication code [GPAPP]
  If the peer is detected to be down, GPMod is informed via the ioctl
  GPMOD_NCRA_PEER_DOWN call. The link up event is propagated to GPMod via GPMOD_NCRA_PEER_UP ioctl 8. References
  [MODULE] Generic Proxy—Module Detailed Design, $/NetCelera/Generic compression Box/Documents/Generic Proxy—Module Detailed Design.doc
  [GPAPP] Generic Proxy—Application Design, $/NetCelera/Generic Compression Box/Documents/Generic Proxy—Software Architecture.doc

What is claimed as new and desired to be protected by Letters Patent of the United States is:

1. A proxy device, comprising:
  one or more interfaces that are configured to enable the proxy device to communicate with at least a second proxy device; and
  a processor that is configured to execute computer instructions that performs actions, including:

receiving a packet;
    determining a destination for the received packet at least partly based on whether the packet is associated with an active session being processed by the proxy device, and on whether the received packet has been previously forwarded by the proxy device to the second proxy device; and
    when it is determined that the packet is unassociated with an active session being processed by the proxy device and the packet has been previously forwarded from the proxy device to the second proxy device, then:
        determining whether a proxy connection is reusable to a third proxy device associated with a destination end-terminal, and if so, then forwarding the packet to the third proxy device re-using the proxy connection, and
        when a proxy connection reuse is unavailable, performing a search for an unused connection to the third proxy device, and when the unused connection is found, establishing an active connection and forwarding the packet towards the destination end-terminal using the established active connection.

2. The proxy device of claim 1, wherein the processor further maintains a pool of unused connections to other proxy device.

3. The proxy device of claim 1, wherein proxy connection information is stored in an array sorted by address.

4. The proxy device of claim 1, wherein the processor further removes least used connections when an amount of free memory is determined to be less than a defined amount or a percentage of file descriptors allowed per process exceeds another defined amount.

5. The proxy device of claim 1, wherein the processor further sends ping commands on connections to determine whether the connections are valid.

6. The proxy device of claim 1, wherein a connection between the proxy device and the second proxy device employs a compression dictionary.

7. The proxy device of claim 1, wherein determining whether the packet is associated with an active session is based on examining at least one of a packet source address, destination address, or packet content.

8. An apparatus comprising a non-transitory computer readable medium, having computer-executable instructions stored thereon, that in response to execution by a proxy device, cause the proxy device to perform operations, comprising:
    receiving a packet; and
    when it is determined that the packet is unassociated with an active session being processed by the proxy device and the packet has been previously forwarded from the proxy device to a second proxy device, then:
        determining whether a proxy connection is reusable to a third proxy device associated with a destination end-terminal, and if so, then forwarding the packet towards the destination end-terminal re-using the proxy connection, and
        when a proxy connection reuse is unavailable, performing a search for an unused connection to the third proxy device, and when the unused connection is found, establishing an active connection and forwarding the packet towards the destination end-terminal using the established active connection.

9. The apparatus of claim 8, wherein the apparatus performs further actions, including:
    determining a destination for the received packet at least partly based on whether the packet is associated with an active session being processed by the proxy device, and on whether the received packet has been previously forwarded by the proxy device to the second proxy device.

10. The apparatus of claim 8, wherein the apparatus further maintains a pool of unused connections to other proxies.

11. The apparatus of claim 8, wherein the apparatus further removes least used connections when an amount of free memory is determined to be less than a defined amount or a percentage of file descriptors allowed per process exceeds another defined amount.

12. The apparatus of claim 8, wherein the apparatus further sends ping commands on connections to determine whether the connections are valid.

13. The apparatus of claim 8, wherein the apparatus further creates a new entry into a pool of unused connections when a connection is closed and no matching entry for the new entry is found in the pool.

14. The apparatus of claim 8, wherein when it is determined that a connection towards the destination end-terminal device is unavailable to the apparatus, forwarding the packet towards the second proxy device to be forwarded by the second proxy device towards the destination end-terminal device.

15. A computer-based method operating on a proxy device, comprising:
    receiving a packet at the proxy device, the proxy device having a processor to perform actions; and
    when it is determined that the packet is unassociated with an active session being processed by the proxy device and the packet has been previously forwarded from the proxy device to a second proxy device and returned to the proxy device, then:
        determining whether a proxy connection is reusable to a third proxy device that is associated with a destination end-terminal, and if so, then forwarding the packet towards the destination end-terminal re-using the proxy connection, and
        when a proxy connection reuse is unavailable, performing a search for an unused connection to the third proxy device, and when the unused connection is found, establishing an active connection and forwarding the packet towards the destination end-terminal using the established active connection.

16. The computer-based method of claim 15, wherein the method further comprising, maintaining a pool of unused connections to other proxies, the pool including entries representing a remote proxy device having references to other proxy devices representing port numbers.

17. The computer-based method of claim 15, wherein the method further comprising, removing least used connections when an amount of free memory is determined to be less than a defined amount or a percentage of file descriptors allowed per process exceeds another defined amount.

18. The computer-based method of claim 15, wherein determining whether the packet is associated with an active session is based on examining at least one of a packet source address, destination address, or packet content.

19. The computer-based method of claim 15, wherein when the connection towards the destination end-terminal is determined to be unavailable, receiving at least one response to the packet through the second proxy device.

20. The computer-based method of claim 15, wherein the method further comprising, based on detecting a defined event, changing the active session to be processed by the second proxy device.

* * * * *